Feb. 18, 1969  S. D. CAPPOTTO  3,427,893
BELT TENSIONING DEVICE
Filed Jan. 26, 1967
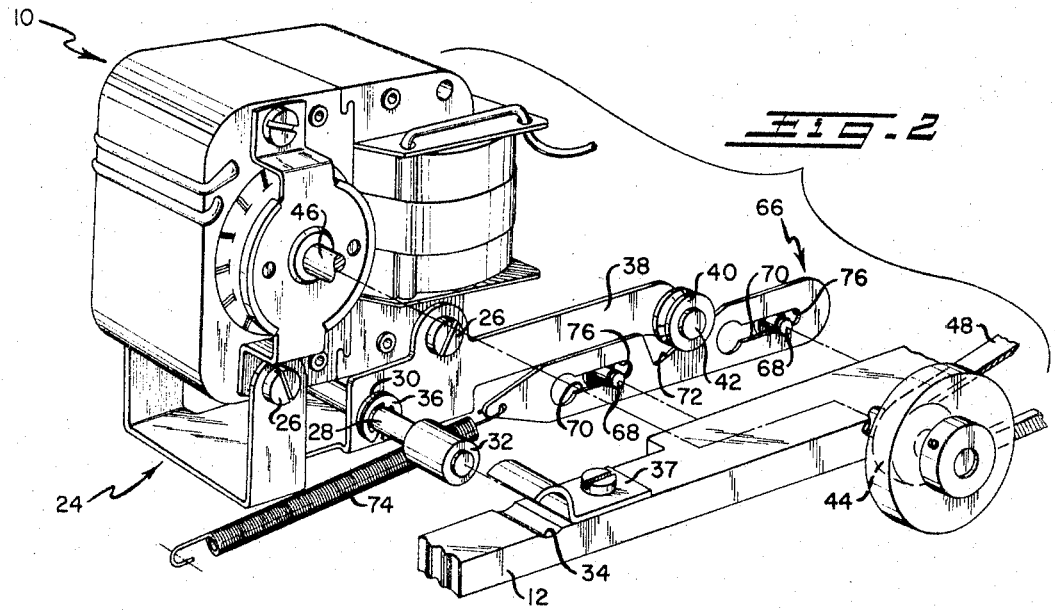
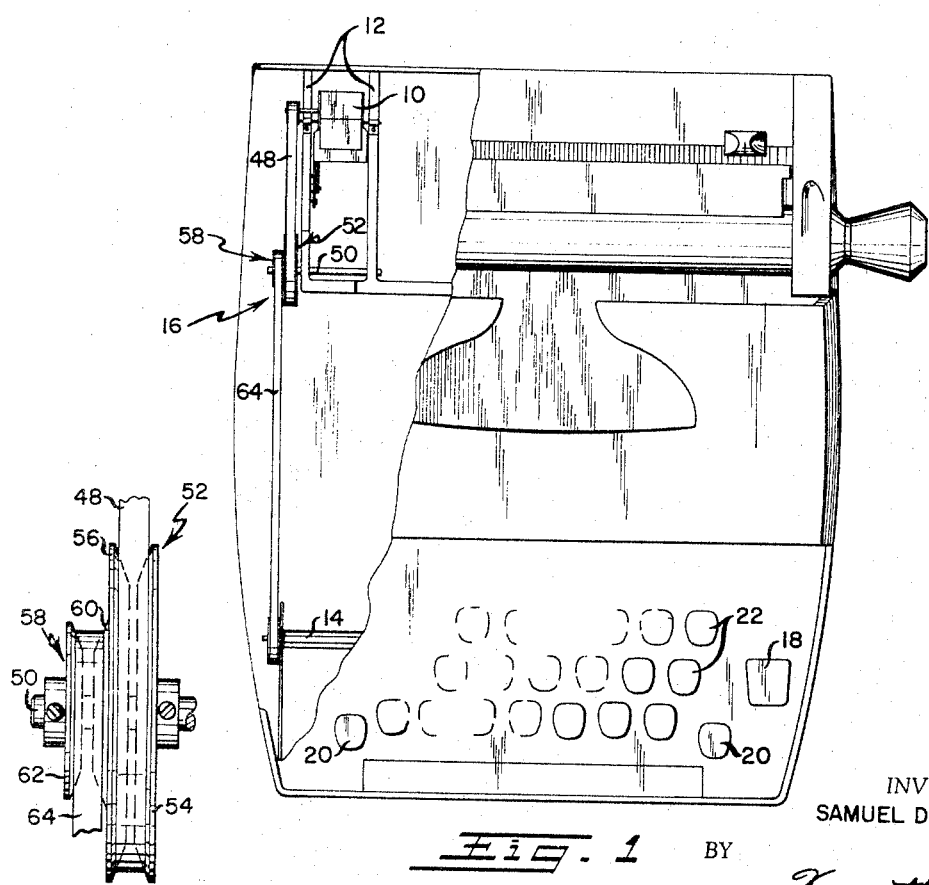
INVENTOR.
SAMUEL D. CAPPOTTO
BY
Kenneth H. Grub
AGENT 3,427,893
BELT TENSIONING DEVICE
Samuel D. Cappotto, Syracuse, N.Y., assignor to SCM Corporation, a corporation of New York
Filed Jan. 26, 1967, Ser. No. 611,907
U.S. Cl. 74—242.13               6 Claims
Int. Cl. F16h 7/12

ABSTRACT OF THE DISCLOSURE

A device having a spring biased wedging member operable to act on a pivotally mounted motor for stabilizing the tension of a belt drive system which is subjected to wear, stretching and sudden excessive loading.

Background of the invention

This invention relates to prime moving systems for power driven typewriters and more particularly to those systems that employ a belt tensioning means to compensate for varying belt tensions resulting from wear and varying loading.

Most prime moving systems for typewriters employ a spring biased idler pulley to automatically compensate for belt slackness as wear results. However, when a heavy load is applied to the system, e.g., carriage return or segment shift, the idler pulley lurches from the initial shock of a heavy load which varies belt tension by first being excessively tight and secondly being loose when the load is released, resulting in erratic typewriter function operations. Another disadvantage of biased idler pulley structure is that it inherently creates noise and vibration.

Summary of the invention

The employment of a biased wedging member against a pivotally mounted motor provides the system with the automatic tension needed to compensate for wear resulting belt slackness, while it also provides a blocking means for the motor when it momentarily tends to lurch under the influence of the initial shock of a heavy load.

Another advantage of the invention is that it substantially reduces noise and vibration.

Brief description of the drawings

FIGURE 1 is a top plan view partly in section showing a pulley and belt drive train for typewriter;

FIGURE 2 is a rear perspective view of the machine motor and the principal parts of the invention; and FIGURE 3 is an enlarged partial top plan view of FIGURE 1 showing a speed reduction pulley arrangement in the drive train.

The invention is comprised of a slideably mounted spring biased member having an inclined surface which contacts a pivotally mounted motor arm for biasing the motor rearward and tensioning the motor driven V-belt drive train. The relationship between the motor pivot and the motor arm contacting the inclined surface is such that the member may be very slightly sprung and still provide a block which will present a forward movement of the motor when it is subjected to the initial shock of heavy loads.

More specifically and with reference to FIG. 1, a motor 10 is pivotally mounted between two typewriter frame members 12 for continuously driving a plurality feature actuating power roll 14 by way of speed reduction pulley and belt drive train 16. The features to be actuated by the power roll 14 are selectively engaged with the power roll 14 upon depression of appropriate keys on the machine keyboard and through conventional operating mechanism, perform their specific function. Some feature mechanisms, because of their functions, require more energy for their performance than do other mechanisms. For example, the energy required to return a conventional typewriter carriage, key 18, or to shift a typebar segment key 20, is substantially greater than the energy required to actuate a type bar printing action, keys 20. The greater energy places a sudden excessive loading on the drive train 16.

Referring now to FIGURE 2, the motor 10 is rigidly mounted on a bracket 24 by screws 26. Bracket 24 is pivotally supported on a shaft 28 by a pair of nylon bearings 30 (one of which is shown). The shaft 28 is rigidly supported on frame members 12 by rubber sleeves 32, for sound deadening purposes seated in grooves 34 with clamps 37. A pair of keepers 36 holds the motor 10 axially on shaft 28. An arm 38 integrally extends forwardly from bracket 24 and has grooved roller 40 pivotally supported on the end thereof by a shouldered pin 42. A V-type pulley 44 is rigidly mounted on the motor shaft 46 having a V-belt 48 rotatable thereby.

In reference to FIGURES 1 and 3, the pulley and belt drive train 16 includes a shaft 50 pivotally supported in frame members 12. A divided V-type pulley 52 having one part 54 rigidly connected to shaft 50 and having the second part 56 supported on shaft 50 for axially slidable and rotatable movement relative thereto is rotated by belt 48. A second divided V-type pulley 58 has one of its parts 60 integral with part 56 of pulley 52 and has its second part 62 rigidly connected to shaft 50. A V-belt 64 connects pulley 58 to the power roll 14.

Referring back to FIGURE 2, the wedging means which is operable to automatically tension the pulley and belt drive train 16 a predetermined amount includes a member 66 slideably mounted on frame 12 by a pair of shouldered screws 68 extending through elongated slots 70. Member 66 has an inclined surface 72 on its upper edge located between the screws 68. A spring 74 has one end connected to a rigid anchor and has the other end connected to member 66 and is orientated to pull the inclined surface 72 against the grooved roller 40 which creates a frictional wedge between the roller 40 and the upper edges 76 of slots 70 against the shoulder portion of screws 68. Spring 74 is relatively long to maintain a desirable biasing force throughout the variable positions of member 66.

This construction provides an automatic belt tensioning means and provides a substantially constant rate of rotation of the power roll 14 when the drive train 16 is subjected to the previously described sudden excessive loading. When the invention is initially assembled in the machine and motor 10 is energized for rotating the drive train 16 under a normal no load condition, and the tension of belts 48 and 64 is less than the desirable predetermined amount, the spring 74 is sufficiently strong to slide member 66 along screws 68 which causes the inclined surface 72 to wedge under roller 40 thereby pivoting the motor rearward. Pulley 44 now tightens belt 48 which forces part 56 (FIGURE 3) axially away from part 54 of pulley 52. Part 60 of pulley 58 is now forced toward part 62 which drives V-belt 64 to a larger diameter position thereby tightening belt 64 to the predetermined amount. When the motor 10 is energized for rotating the drive train 16 under a normal no load condition and a sustained belt tension is greater than the predetermined amount, the tension of belt 48 pulls on pulley 44 which pivots motor 10 about shaft 28 causing roller 40 of arm 38 to press against inclined surface 72 with a force sufficient to slide member 66 slightly away from the motor 10 against the bias of spring 74. This releases the tension in the belts 48 and 64 but not sufficiently to establish the desirable predetermined amount of tension. After the reduced tension is equalized by pulleys 52 and 58 and belts 48 and 64, the remaining excessive tension is again transferred to the motor arm 38 which again slides member 66 slightly away from the motor 10. Repeated action by this tensioning device causes roller 40 to create a tamping or vibrating effect on the inclined surface 72 until member 66 is driven away from the motor a distance that results in the desirable predetermined amount of belt tension. If a sustained belt tension that is greater than the predetermined amount is caused by any adverse operating condition of the typewriter, such as a blocked power roll 14, the drive train 16 will impart the tamping effect on member 66 which will release a substantial amount of belt tension to permit either or both of the belts 48 and 64 to slip around their respetcive pulleys thereby relieving the strain on the drive train 16.

The present wedging means is constructed to prevent motor 10 from pivoting or lurching when the drive train 16 is subjected to sudden excessive loading thereby maintaining a stabilized belt tension and therefor a stabilized power roll rotation. When the excessive load of shifting the type bar segment, as an example, tightens the drive train 16, the motor 10 tends to pivot but the excessive load is only momentary, as compared to a sustained excessive load. With only a momentary loading, the motor 10 is blocked by the member 66 and spring 74 combination and the rate of rotation of the power roll 14 and drive train 16 remains constant.

It can now be seen that the present invention provides an automatic belt tensioning device for motor driven prime moving systems which is also capable of remaining stable when subjected to the initial shock of varied loads and which reduces noise and vibration to a minimum.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A prime moving system tensioning device comprising:
    (a) a framework (12);
    (b) a driving member (10) pivotally mounted on said framework (12);
    (c) a driven member (14) rotatably mounted on said framework (12);
    (d) means (16) connecting said driving member (10) to said driven member (14) for rotating said driven member (14); and
    (e) wedging means (66, 74, 38, 28) including a member (66) operable to pivot said driving member (10) for tensioning said connecting means (16).

2. A tensioning device as defined in claim 1 wherein said wedging means includes an arm (38) operable to tension said connecting means (16), said member (66) having an inclined surface (72) engageable with said arm (38) and biasing means (74) effective to urge said inclined surface (72) against said arm (38) for tensioning said connecting means (16).

3. A tensioning device as defined in claim 2 wherein said arm (38) is supported on said driving member (10) for pivoting said driving member (10) thereby tensioning said connecting means (16).

4. A tensioning device as claimed in claim 1 wherein said connecting means includes a pulley and belt drive train (16) subject to sudden excessive loading from said driven member (14) which tends to pivot said driving member (10) and said wedging means comprises:
    (a) an arm (38) mounted for pivoting said driving member (10);
    (b) said member (66) having an inclined surface (72) and being slidably mounted on the framework (12) in a position for said inclined surface (72) to engage said arm (38); and
    (c) a spring (74) for biasing said inclined surface (72) against said arm (38), to pivot said driving member (10) for tightening said drive train (16) a predetermined amount and to prevent said driving member (10) from pivoting when said drive train (16) is subjected to the sudden excessive loading.

5. A tensioning device as defined in claim 1 wherein said connecting means includes a pulley and belt drive train (16) subject to wear thereby affecting the pivotal position of said driving member (10) and said wedging means comprises:
    (a) an arm (38) mounted for pivoting said driving member (10);
    (b) said member (66) having an inclined surface (72) and being slidably mounted on the framework (12) in a position for said inclined surface (72) to engage said arm (38); and
    (c) a spring (74) for biasing said inclined surface (72) against said arm (38) to pivot said driving member (10) to tighten said drive train (16) a predetermined amount as said wear occurs.

6. A typewriter or the like having a motor (10), a rotatable power roll (14) for operating typewriter instrumentalities, a pulley and belt drive train (16) connecting the motor (10) to the power roll (14) and a wedging means operable for automatically tensioning the belt a predetermined amount comprising:
    (a) the motor (10) being pivotally mounted for tensioning the drive train (16);
    (b) an arm (38) connected to the motor (10);
    (c) a slidable member (66) having an inclined surface (72) engageable with said arm (38); and
    (d) a spring (74) connected to said slidable member (66) for biasing said inclined surface (72) against said arm (38) with a force sufficient to pivot the motor (10) to increase the tension of the drive train (16) when the continuously operating drive train tension is less than the predetermined amount and with a force sufficiently low to permit a continuously operating drive train having a sustained tension which is greater than the predetermined amount to pivot the motor (10) which drives said arm (38) against said slidable member inclined surface (72) to slide said member (66) to a position where said arm (38) locates at a lower point on said inclined surface (72) thereby reducing the tension of the drive train (16) to the predetermined amount.

References Cited

UNITED STATES PATENTS

| | | | |
|---|---|---|---|
| 1,802,485 | 4/1931 | Smith et al. | 74—242.13 |
| 2,210,276 | 8/1940 | Bremer | 74—242.11 |
| 2,280,105 | 4/1942 | Sturgess | 74—242.11 XR |
| 2,341,992 | 2/1944 | Jarrett | 74—242.15 |
| 2,921,660 | 1/1960 | Barkdoll | 197—17 |

FRED C. MATTERN, JR., *Primary Examiner.*

J. A. WONG, *Assistant Examiner.*

U.S. Cl. X.R.

74—242.15